United States Patent
Takahashi et al.

(10) Patent No.: US 12,526,091 B2
(45) Date of Patent: Jan. 13, 2026

(54) TERMINAL, BASE STATION AND RADIO COMMUNICATION METHOD

(71) Applicant: NTT DOCOMO, INC., Tokyo (JP)

(72) Inventors: Yuki Takahashi, Tokyo (JP); Satoshi Nagata, Tokyo (JP); Qiping Pi, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 307 days.

(21) Appl. No.: 18/272,245

(22) PCT Filed: Jan. 15, 2021

(86) PCT No.: PCT/JP2021/001371
§ 371 (c)(1),
(2) Date: Jul. 13, 2023

(87) PCT Pub. No.: WO2022/153509
PCT Pub. Date: Jul. 21, 2022

(65) Prior Publication Data
US 2024/0080140 A1  Mar. 7, 2024

(51) Int. Cl.
*H04L 1/1829* (2023.01)
*H04W 72/232* (2023.01)

(52) U.S. Cl.
CPC ......... *H04L 1/1854* (2013.01); *H04W 72/232* (2023.01)

(58) Field of Classification Search
None
See application file for complete search history.

(56) References Cited

U.S. PATENT DOCUMENTS

| | | | |
|---|---|---|---|
| 2021/0194643 A1 | 6/2021 | Parkvall et al. | |
| 2022/0045801 A1* | 2/2022 | Wang | H04W 72/56 |
| 2022/0060288 A1* | 2/2022 | Sun | H04W 72/23 |
| 2023/0261840 A1* | 8/2023 | Wong | H04L 1/1812 |
| | | | 370/329 |
| 2023/0283415 A1* | 9/2023 | Blankenship | H04L 1/1854 |
| | | | 370/329 |

FOREIGN PATENT DOCUMENTS

JP   2020519129 A   6/2020

OTHER PUBLICATIONS

Office Action issued in Japanese Patent Application No. 2022-575013, dated Dec. 3, 2024 (6 pages).

(Continued)

*Primary Examiner* — Brian S Roberts
(74) *Attorney, Agent, or Firm* — Osha Bergman Watanabe & Burton LLP

(57) ABSTRACT

A terminal comprising: a control unit that performs feedback control to transmit two or more acknowledgments over one physical uplink control channel, wherein the control unit performs, when the two or more acknowledgments include a first acknowledgment with a first priority and a second acknowledgment with a second priority different from the first priority, the feedback control using a resource related to a specific acknowledgment of either the first acknowledgment or the second acknowledgment.

5 Claims, 9 Drawing Sheets

(56) References Cited

OTHER PUBLICATIONS

International Search Report issued in PCT/JP2021/001371 on Aug. 31, 2021 (1 page).
Written Opinion of the International Searching Authority issued in PCT/JP2021/001371 on Aug. 31, 2021 (3 pages).
Nokia, Nokia Shanghai Bell; "Revised WID: Enhanced Industrial Internet of Things (IoT) and ultra-reliable and low latency communication (URLLC) support for NR"; 3GPP TSG RAN Meeting #88e, RP-201310; Electronic Meeting; Jun. 29-Jul. 3, 2020 (6 pages).
Ericsson; "HARQ-ACK Enhancements for IIoT/URLLC"; 3GPP TSG-RAN WG1 Meeting #103-e, R1-2007707; Online; Oct. 26-Nov. 13, 2020 (11 pages).
Office Action issued in Japanese Patent Application No. 2022-575013, issued Apr. 15, 2025 (7 pages).

* cited by examiner

TERMINAL, BASE STATION AND RADIO COMMUNICATION METHOD

TECHNICAL FIELD

The present disclosure relates to a terminal, a base station and a radio communication method that perform radio communication, and in particular, a terminal, a base station and a radio communication method that perform communication concerning acknowledgment.

BACKGROUND ART

3rd Generation Partnership Project (3GPP) specifies 5th generation mobile communication system (5G, also called New Radio (NR) or Next Generation (NG), further, a succeeding system called Beyond 5G, 5G Evolution or 6G is being specified.

Release 15 of 3GPP supports multiplexing of two or more uplink channels (Physical Uplink Control Channel (PUCCH) and Physical Uplink Shared Channel (PUSCH)) transmitted in the same slot.

In addition, Release 17 of 3GPP agreed to support multiplexing UCIs (Uplink Control Information) with different priorities into PUCCH. For example, UCIs include acknowledgments (Hybrid Automatic Repeat Request (HARQ)-ACKs) with different priorities (For example, non-patent literature 1).

CITATION LIST

Non-Patent Literature

Non-Patent Literature 1: "Enhanced Industrial Internet of Things (IoT) and ultra-reliable and low latency communication," RP-201310, 3GPP TSG RAN Meeting #86 e, 3GPP, July 2020.

SUMMARY OF INVENTION

By the way, there is a known mechanism (one-shot HARQ-ACK Feedback) that transmits two or more HARQ ACKs corresponding to each of two or more HARQ processes from one PUCCH (Physical Uplink Control Channel) to the network from a terminal (UE (User Equipment)).

Under these circumstances, after careful consideration, the inventors found it necessary to devise a method for sending two or more HARQ-ACKs with different priorities in the one-shot HARQ Feedback.

In view of these circumstances, the objective is to provide a terminal, a base station and a radio communication method that can appropriately perform HARQ-ACK communication in a case where two or more HARQ-ACKs are sent by one PUCCH.

One aspect of the present disclosure is a terminal comprising: a control unit that performs feedback control to transmit two or more acknowledgments over one physical uplink control channel, wherein the control unit performs, when the two or more acknowledgments include a first acknowledgment with a first priority and a second acknowledgment with a second priority different from the first priority, the feedback control using a resource related to a specific acknowledgment of either the first acknowledgment or the second acknowledgment.

One aspect of the present disclosure is a base station comprising: a control unit that performs feedback control to transmit two or more acknowledgments over one physical uplink control channel, wherein the control unit assumes, when the two or more acknowledgments include a first acknowledgment with a first priority and a second acknowledgment with a second priority different from the first priority, the feedback control using a resource related to a specific acknowledgment of either the first acknowledgment or the second acknowledgment.

One aspect of the present disclosure is a radio communication method comprising: a step A of performing feedback control to transmit two or more acknowledgments over one physical uplink control channel, wherein the step A includes a step of performing, when the two or more acknowledgments include a first acknowledgment with a first priority and a second acknowledgment with a second priority different from the first priority, the feedback control using a resource related to a specific acknowledgment of either the first acknowledgment or the second acknowledgment.

MODES FOR CARRYING OUT THE INVENTION

Figure 1:
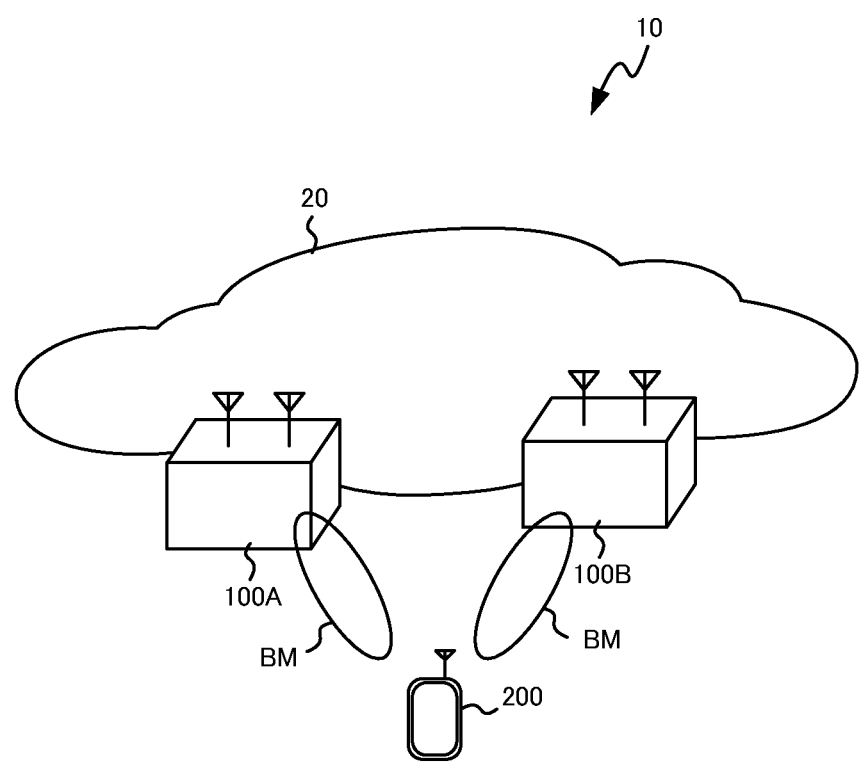
FIG. 1 is an overall schematic diagram of radio communication system 10.

Exemplary embodiments of the present invention are explained below with reference to the accompanying drawings. Note that, the same or similar reference numerals have been attached to the same functions and configurations, and the description thereof is appropriately omitted.

Embodiment (1) Overall Schematic Configuration of the Radio Communication System FIG. 1 is the overall schematic configuration of a radio communication system 10 according to the embodiment. The radio communication system 10 is radio communication system according to 5G New Radio (NR) and includes Next Generation-Radio Access Network 20 (NG-RAN 20, and Terminal 200 (Below, UE 200).

The radio communication system 10 may be radio communication system according to a scheme called Beyond 5G, 5G Evolution or 6G.

NG-RAN 20 includes a radio base station 100 A (Below: gNB 100 A) and a radio base station 100 B (Less than or equal to gNB 100 B). The specific configuration of radio communication system 10 including the number of gNBs and UEs is not limited to the example shown in FIG. 1.

The NG-RAN 20 actually includes multiple NG-RAN nodes, specifically, gNBs (or ng-eNBs), and is connected to a core network (5GC, not shown) according to 5G. Note that the NG-RAN 20 and 5GCs may simply be described as a network.

The gNB 100 A and gNB 100 B are radio base stations in accordance with 5G and perform radio communication in accordance with the UE 200 and 5G. The gNB 100 A, gNB 100 B and UE 200 are capable of supporting Massive MIMO (Multiple-Input Multiple-Output) which generates a more directional beam BM by controlling radio signals transmitted from multiple antenna elements, carrier aggregation (CA) which uses multiple component carriers (CCs) bundled together, and dual connectivity (DC) which communicates with two or more transport blocks simultaneously between the UE and each of the two NG-RAN nodes.

Figure 2:
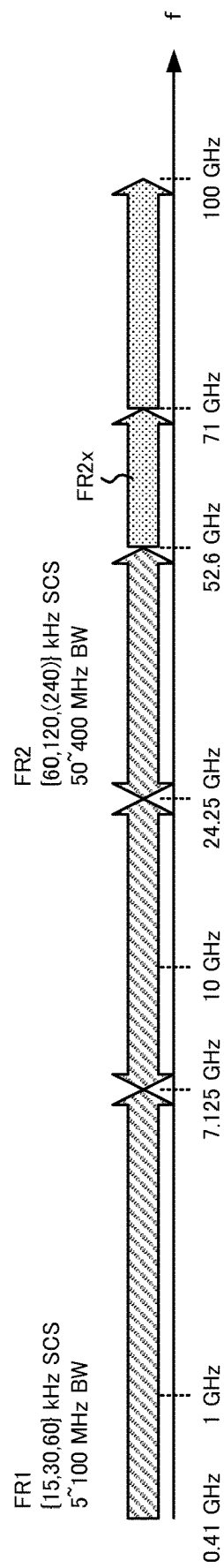
FIG. 2 is a diagram showing the frequency range used in radio communication system 10.

The radio communication system 10 also supports multiple frequency ranges (FRs). FIG. 2 shows the frequency ranges used in the radio communication system 10.

As shown in FIG. 2, the radio communication system 10 corresponds to FR1 and FR2. The frequency bands of each FR are as follows:
FR 1: 410 MHz to 7.125 GHz
FR 2: 24.25 GHz to 52.6 GHz
FR 1 uses sub-carrier spacing (SCS) of 15, 30 or 60 kHz and may use a bandwidth (BW) of 5~100 MHz. FR 2 is a higher frequency than FR 1 and an SCS of 60 or 120 kHz (240 kHz may be included) may be used and a bandwidth (BW) of 50~400 MHz may be used.

SCS may be interpreted as numerology. Numerology is defined in 3GPP TS 38.300 and corresponds to one subcarrier interval in the frequency domain.

In addition, the radio communication system 10 corresponds to a higher frequency band than that of FR 2. Specifically, the radio communication system 10 corresponds to a frequency band above 52.6 GHz and up to 114.25 GHz. Such a high frequency band may be referred to as "FR 2x" for convenience.

To solve such problems, Cyclic Prefix-Orthologous Frequency Division Multiplexing (CP-OFDM)/Discrete Fourier Transform-Spread (DFT-S-OFDM) with larger Sub-Carrier Spacing (SCS) may be applied when using a band exceeding 52.6 GHz.

Figure 3:
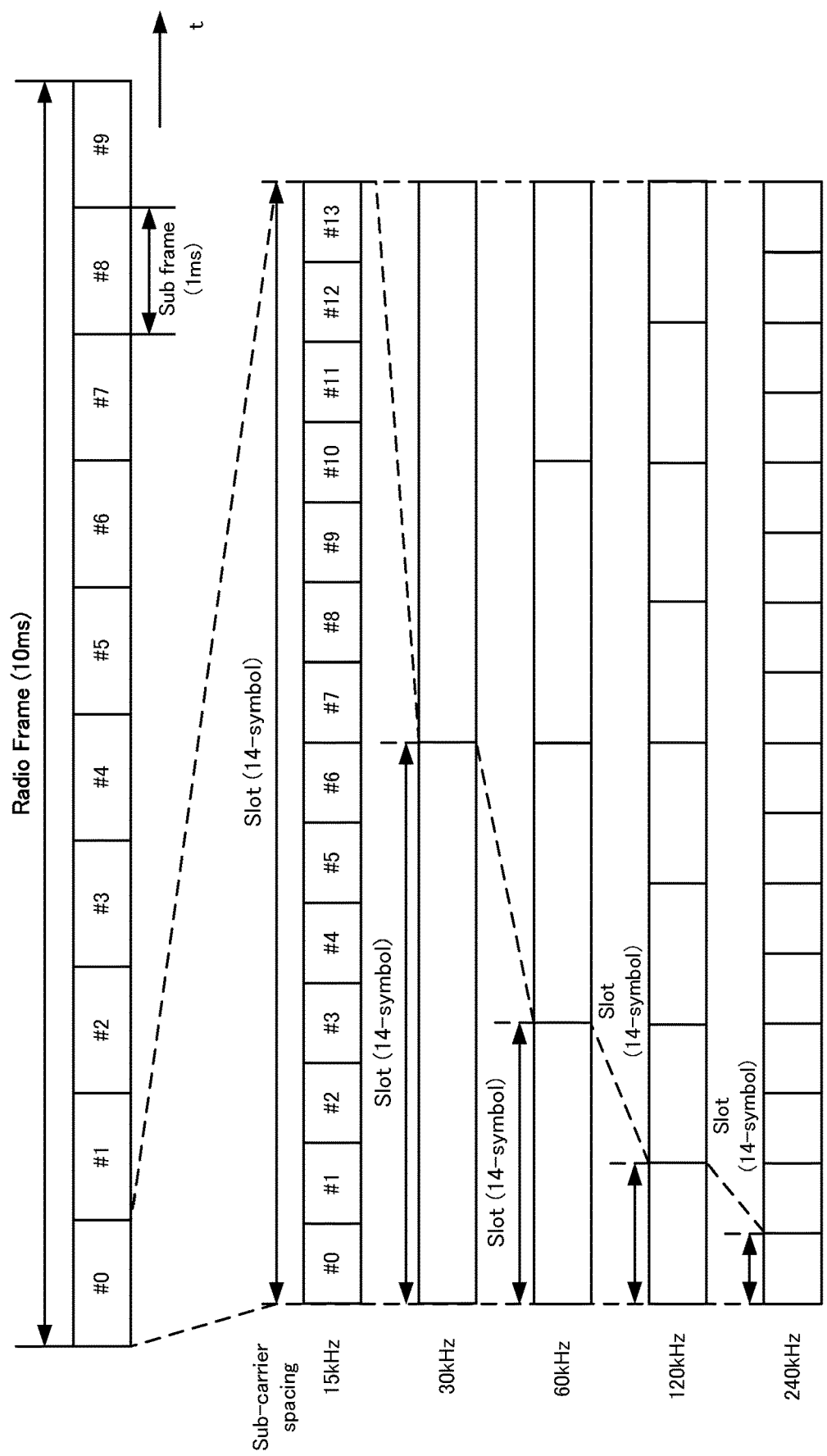
FIG. 3 is a diagram showing an example configuration of the radio frame, subframe and slot used in radio communication system 10.

FIG. 3 shows an example configuration of the radio frame, subframe and slot used in the radio communication system 10.

As shown in FIG. 3, one slot consists of 14 symbols, and the larger (wider) the SCS, the shorter the symbol period (and slot period). The SCS is not limited to the interval (frequency) shown in FIG. 3. For example, 480 kHz, 960 kHz, etc. may be used.

In addition, the number of symbols constituting 1 slot need not necessarily be 14 symbols (For example, 28, 56 symbols). Furthermore, the number of slots per subframe may vary depending on the SCS.

Note that the time direction (t) shown in FIG. 3 may be referred to as a time domain, symbol period or symbol time. The frequency direction may also be referred to as a frequency domain, resource block, subcarrier or bandwidth part (BWP).

DMRS is a type of reference signal that is prepared for various channels. Here, unless otherwise noted, DMRS for the downlink data channel, specifically PDSCH (Physical Downlink Shared Channel), may be used. However, the upstream data channel, specifically DMRS for PUSCH (Physical Uplink Shared Channel), may be interpreted in the same way as DMRS for PDSCH.

DMRS may be used for channel estimation in a device, e.g., as part of coherent demodulation, in UE 200. DMRS may only reside in resource blocks (RBs) used for PDSCH transmission.

DMRS may have multiple mapping types. Specifically, DMRS has mapping type A and mapping type B. In mapping type A, the first DMRS is placed on the second or third symbol of the slot. In mapping type A, the DMRS may be mapped relative to the slot boundary regardless of where the actual data transmission begins in the slot. The reason the first DMRS is placed on the second or third symbol of the slot may be interpreted as placing the first DMRS after the control resource sets (CORESET).

In mapping type B, the first DMRS may be placed on the first symbol of the data allocation. That is, the position of the DMRS may be given relative to where the data is placed, not relative to the slot boundary.

In addition, the DMRS may have multiple types (Types). Specifically, the DMRS has Type 1 and Type 2. Type 1 and Type 2 differ in the maximum number of mapping and orthogonal reference signals in the frequency domain. Type 1 can output up to four orthogonal signals with single-symbol DMRS, and Type 2 can output up to eight orthogonal signals with double-symbol DMRS.

(2) Radio Communication System Functional Block Configuration Next, the Functional Block Configuration of the Radio Communication System 10 Will be Described First, the functional block configuration of the UE 200 will be described.

Figure 4:
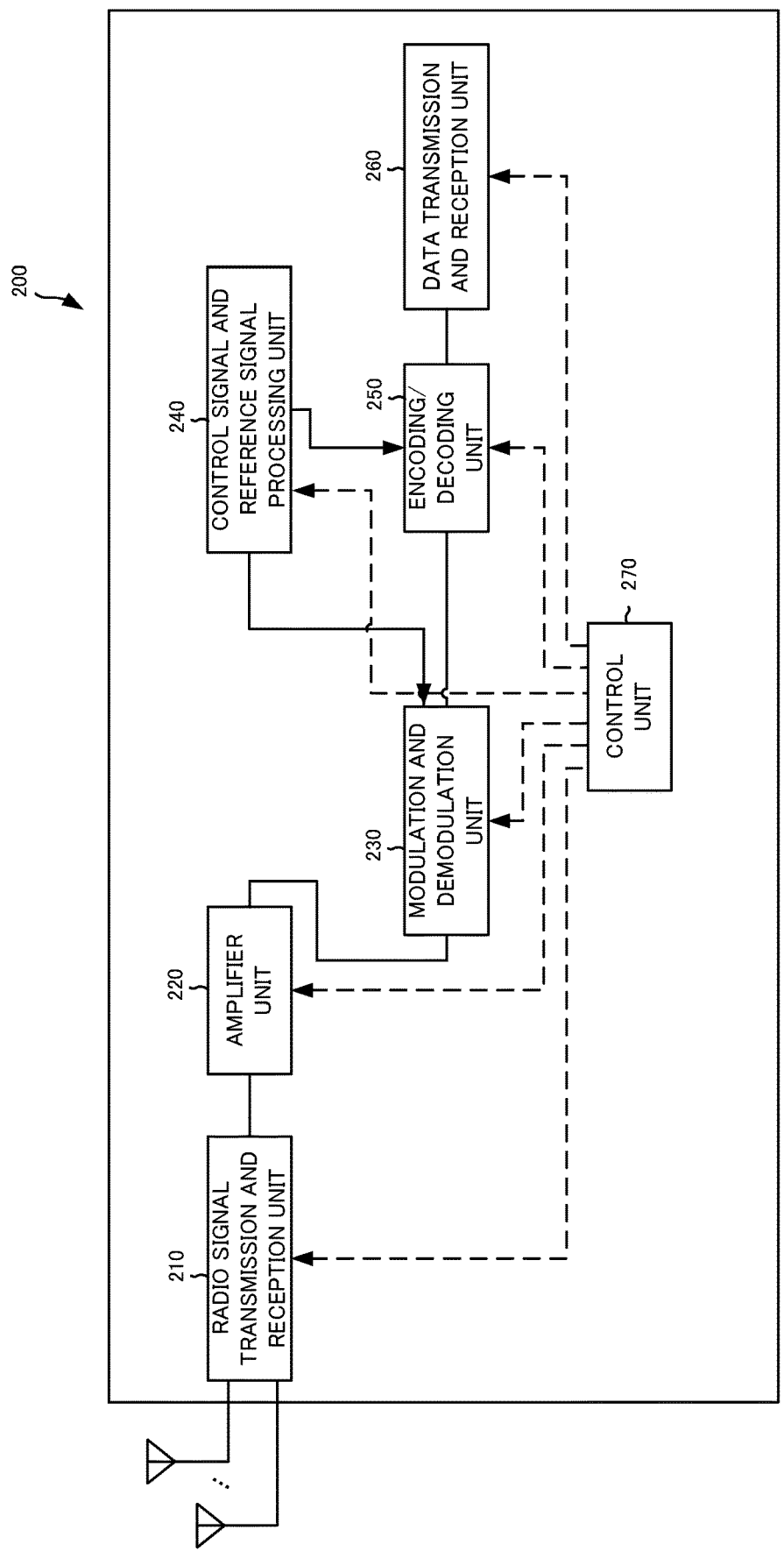
FIG. 4 is a functional block configuration diagram of the UE 200.

FIG. 4 is a functional block configuration diagram of the UE 200. As shown in FIG. 4, the UE 200 comprises a radio signal transmission and reception unit 210, an amplifier unit 220, a modulation and demodulation unit 230, a control signal and reference signal processing unit 240, an encoding/decoding unit 250, a data transmission and reception unit 260 and a control unit 270.

The radio signal transmission and reception unit 210 transmits and receives radio signals in accordance with NR. The radio signal transmission and reception unit 210 supports Massive MIMO, CA for bundling multiple CCs, and DC for simultaneously communicating between UE and each of the 2 NG-RAN nodes.

The amplifier unit 220 is composed of PA (Power Amplifier)/LNA (Low Noise Amplifier), etc. The amplifier unit 220 amplifies the signal output from the modulation and demodulation unit 230 to a prescribed power level. The amplifier unit 220 amplifies the RF signal output from the radio signal transmission and reception unit 210.

The modulation and demodulation unit 230 performs data modulation/demodulation, transmission power setting and resource block allocation for each predetermined communication destination (gNB 100 or other gNB). On the modulation and demodulation unit 230, Cyclic Prefix-Orthogonal-Frequency Division Multiplexing (CP-OFDM)/Discrete Fourier Transform-Spread (DFT-S-OFDM) may be applied. DFT-S-OFDM may be used not only for the uplink (UL) but also for the downlink (DL).

The control signal and reference signal processing unit 240 performs processing for various control signals transmitted and received by the UE 200 and processing for various reference signals transmitted and received by the UE 200.

Specifically, the control signal and reference signal processing unit 240 receives various control signals transmitted from the gNB 100 via a predetermined control channel, such as control signals of a radio resource control layer (RRC). The control signal and reference signal processing unit 240 also transmits various control signals toward the gNB 100 via a predetermined control channel.

The control signal and reference signal processing unit 240 performs processing using a reference signal (RS) such as a Demodulation Reference Signal (DMRS) and a Phase Tracking Reference Signal (PTRS).

DMRS is a known reference signal (pilot signal) between individual base stations and terminals for estimating a fading channel used for data demodulation. PTRS is a reference signal for individual terminals for estimating phase noise, which is a problem in high frequency bands.

In addition to DMRS and PTRS, the reference signal may include Channel State Information-Reference Signal (CSI-RS), Sounding Reference Signal (SRS), and Positioning Reference Signal (PRS) for location information.

In addition, the channel includes a control channel and a data channel. The control channels include PDCCH (Physical Downlink Control Channel), PUCCH (Physical Uplink Control Channel), RACH (Random Access Channel), Downlink Control Information (DCI) including Random Access Radio Network Temporary Identifier (RA-RNTI), and Physical Broadcast Channel (PBCH).

The data channels include PDSCH (Physical Downlink Shared Channel) and PUSCH (Physical Uplink Shared Channel). Data means data transmitted through a data channel. A data channel may be read as a shared channel.

Here, the control signal and reference signal processing unit 240 constitutes a reception unit that receives downlink control information (DCI). The DCI includes fields that store, as existing fields, DCI Formats, Carrier indicator (CI), BWP indicator, Frequency Domain Resource Allocation (FDRA), Time Domain Resource Allocation (TDRA), Modulation and Coding Scheme (MCS), HARQ Process Number (HPN), New Data Indicator (NDI), and Redundancy Version (RV).

The values stored in the DCI Format fields are information elements that specify the format of the DCI. The value stored in the CI field is an information element that specifies the CC to which the DCI applies. The value stored in the BWP indicator field is an information element that specifies the BWP to which the DCI applies. The BWP that can be specified by the BWP indicator is set by an information element (BandwidthPart-Config) contained in the RRC message. The value stored in the FDRA field is an information element that specifies the frequency domain resource to which the DCI applies. The frequency domain resource is identified by the value stored in the FDRA field and the information element (RA Type) contained in the RRC message. The value stored in the TDRA field is the information element that specifies the time domain resource to which the DCI applies. The time domain resource is identified by the value stored in the TDRA field and the information element (pdsch-TimeDomainAllocationList, pusch-TimeDomainAllocationList) contained in the RRC message. The time domain resource may be identified by the value stored in the TDRA field and the default table. The value stored in the MCS field is the information element that specifies the MCS to which the DCI applies. The MCS is identified by the value stored in the MCS and the MCS table. MCS tables may be specified by RRC messages or identified by RNTI scrambling. The value stored in the HPN field is an information element that specifies the HARQ Process to which the DCI applies. The value stored in the NDI is an information element that specifies whether the data to which the DCI applies is first-time data. The value stored in the RV field is an information element that specifies the redundancy of the data to which the DCI applies.

The encoding/decoding unit 250 performs data division/concatenation and channel coding/decoding for each predetermined communication destination (gNB 100 or other gNB).

Specifically, the encoding/decoding unit 250 divides the data output from the data transmission and reception unit 260 into predetermined sizes and performs channel coding on the divided data. The encoding/decoding unit 250 also decodes the data output from modulation and the demodulation unit 230 and concatenates the decoded data.

The data transmission and reception unit 260 transmits and receives Protocol Data Units (PDU) and Service Data Units (SDU). Specifically, the data transmission and reception unit 260 performs assembly/disassembly of PDUs/SDUs in multiple layers (Media access control layer (MAC), radio link control layer (RLC), and packet data convergence protocol layer (PDCP), etc.). The data transmission and reception unit 260 also performs error correction and retransmission control of data based on HARQ (Hybrid Automatic Repeat Request).

The control unit 270 controls each function block constituting the UE 200. In an embodiment, the control unit 270 performs feedback control to transmit 2 or more acknowledgments (HARQ-ACKs) over one physical uplink control channel (PUCCH). Such feedback control may be referred to as One shot HARQ-ACK feedback or Type 3 HARQ-ACK feedback.

Here, the control unit 270 performs feedback control using resources regarding a specific acknowledgment (Below is a specific HARQ-ACK) of either the first or second acknowledgment where two or more acknowledgments include a first acknowledgment (For example, HP HARQ-ACK) with a first priority (For example, High priority) and a second acknowledgment (For example, LP HARQ-ACK) with a second priority (For example, Low priority) different from the first priority.

Second, the functional block configuration of gNB 100 will be described.

Figure 5:
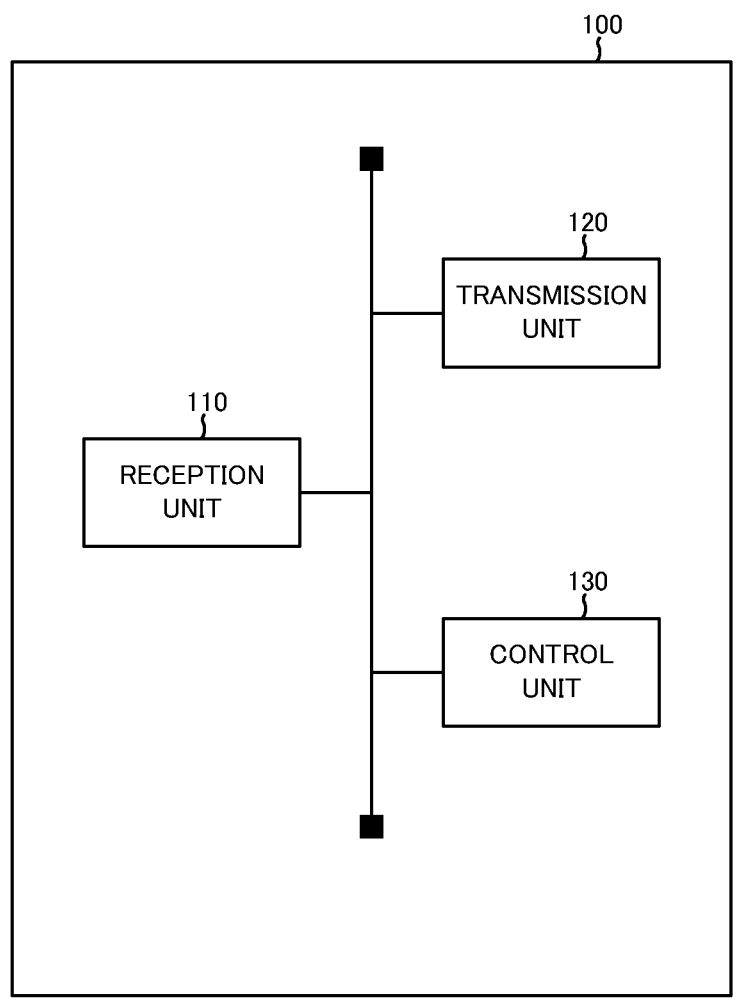
FIG. 5 is a functional block configuration diagram of the gNB 100.

FIG. 5 is a functional block configuration diagram of gNB 100. As shown in FIG. 5, gNB 100 has a reception unit 110, a transmission unit 120 and a control unit 130.

The reception unit 110 receives various signals from UE 200. The reception unit 110 may receive UL signals via PUCCH or PUSCH.

The transmission unit 120 transmits various signals to the UE 200. The transmission unit 120 may transmit DL signals via PDCCH or PDSCH.

The control unit 130 controls the gNB 100. In an embodiment, the control unit 130 performs feedback control to receive two or more acknowledgments (HARQ-ACKs) over one physical uplink control channel (PUCCH). control unit 130 assumes feedback control using resources for a specific HARQ-ACK of either the first acknowledgment or the second acknowledgment if the two or more acknowledgments include a first acknowledgment (For example, HP HARQ-ACK) with a first priority (For example, High priority) and a second acknowledgment (For example, LP HARQ-ACK) with a second priority (For example, Low priority) different from the first priority.

(3) Background

The background of the embodiment is described below. Although not particularly limited, the embodiment may assume a case in which multiple SPS PDSCH can be set as SPS (Semi-Persistent Scheduling) PDSCH and the SPS PDSCH cycle is shortened. In such a case, increasing SPS PDSCH may result in more UL transmissions canceled in the TDD pattern, and decreasing transmission opportunities for HARQ-ACKs may result in more HARQ-ACKs that cannot be transmitted to NG RAN 20. This may result in increased delay and decreased reliability.

In view of the above possibility, consideration is being given to sending two or more HARQ-ACKs in a batch by Type 3 HARQ-ACK feedback. In this context, the implementation focuses on feedback control for HARQ-ACKs with different priorities. Specifically, the implementation focuses on a case where feedback control for both HARQ-ACKs with different priorities is required.

(4) Operation Example 1

An operation example of the feedback control described above will be described below. In the following, the case where HP HARQ-ACK and LP HARQ ACK are mixed will be mainly described. In operation example 1, when feedback control of both HP HARQ-ACK and LP HARQ ACK is required, the case where HP HARQ-ACK and LP HARQ ACK are transmitted through one PUCCH is assumed.

(4.1) Priority Indicator Field

The UE 200 may perform feedback control based on an information element (Here, the Priority indicator) contained in the DCI that triggers the feedback control described above.

For example, if the priority indicator specifies High priority, the UE 200 may perform feedback control using resources on the HP HARQ-ACK based on settings related to High priority. That is, the specific HARQ-ACK is an HP HARQ-ACK.

The setting for high priority may be set by an RRC message (For example, PUCCH-Config for HP HARQ-ACK). For example, the UE 200 may determine the timing of the HARQ-ACK. The timing of the HARQ-ACK may be determined on a slot-based or sub-slot-based basis. The UE 200 uses the HP PUCCH resource as a resource (Following are HP HARQ-ACK PUCCH resources) used to send a codebook (Below: HP HARQ-ACK CB) for the HP HARQ-ACK. The HP PUCCH resource may be a resource in the case of multiplexing HP PUCCH to PUSCH or the like.

On the other hand, the UE 200 may perform feedback control using the resource on LP HARQ-ACK based on the settings on Low priority when the Priority indicator specifies Low priority. That is, the specific HARQ-ACK is LP HARQ-ACK.

The setting for low priority may be set by an RRC message (For example, PUCCH-Config for LP HARQ-ACK). For example, the UE 200 may determine the timing of the HARQ-ACK. The timing of the HARQ-ACK may be determined on a slot-based or sub-slot-based basis. The UE 200 uses the LP PUCCH resource as a resource (The following are LP HARQ-ACK PUCCH resources) used to send a codebook (Below: LP HARQ-ACK CB) for the LP HARQ-ACK. The LP PUCCH resource may be a resource in the case of multiplexing the LP PUCCH to a PUSCH or the like.

(4.2) DCI Format

The UE 200 may perform feedback control based on the format of the DCI that triggers the feedback control described above.

For example, the UE 200 may perform feedback control using resources on HP HARQ-ACK based on the setting for high priority when the format of the DCI is DCI format 1_2. That is, the specific HARQ-ACK is an HP HARQ-ACK.

The setting for high priority may be set by an RRC message (For example, PUCCH-Config for HP HARQ-ACK). For example, the UE 200 may determine the timing of the HARQ-ACK. The timing of the HARQ-ACK may be determined on a slot-based or sub-slot-based basis. UE 200 uses the HP PUCCH resource as a resource (HP HARQ-ACK PUCCH resource) used to send a codebook (HP HARQ-ACK CB) for HP HARQ-ACK. The HP PUCCH resource may be a resource in the case of multiplexing HP PUCCH to PUSCH or the like.

On the other hand, the UE 200 may perform feedback control using the resource on LP HARQ-ACK based on the setting on Low priority when the DCI format is DCI format 1_1. That is, the specific HARQ-ACK is LP HARQ-ACK.

The setting for low priority may be set by an RRC message (For example, PUCCH-Config for LP HARQ-ACK). For example, the UE 200 may determine the timing of the HARQ-ACK. The timing of the HARQ-ACK may be determined on a slot-based or sub-slot-based basis. The UE 200 uses the LP PUCCH resource as a resource (LP HARQ-ACK PUCCH resource) used to transmit a codebook (LP HARQ-ACK CB) for LP HARQ-ACK. The LP PUCCH resource may be a resource in the case of multiplexing LP PUCCH to PUSCH or the like.

In such a case, the format of the DCI to which the high priority applies may be set by an RRC message or may be predetermined by radio communication system 10. Similarly, the format of the DCI to which the low priority applies may be set by an RRC message or may be predetermined by radio communication system 10.

(4.3) RRC Settings

The UE 200 may perform feedback control based on settings relating to radio resource control (RRC settings). Specifically, a new RRC parameter may be introduced to specify whether feedback control using resources relating to HP HARQ-ACK or LP HARQ-ACK should be performed when feedback relating to HP HARQ-ACK or LP HARQ-ACK is requested. The new RRC parameter may be referred to as PhysicalCellGroupConfig.

For example, the UE 200 may perform feedback control with resources on HP HARQ-ACK based on the settings for High priority when High priority is set by PhysicalCellGroupConFig. That is, a specific HARQ-ACK is an HP HARQ-ACK.

The setting for high priority may be set by an RRC message (For example, PUCCH-Config for HP HARQ-ACK). For example, the UE 200 may determine the timing of the HARQ-ACK. The timing of the HARQ-ACK may be determined on a slot-based or sub-slot-based basis. The UE 200 uses the HP PUCCH resource as a resource (HP HARQ-ACK PUCCH resource) used to send a codebook (HP HARQ-ACK CB) for HP HARQ-ACK. The HP PUCCH resource may be a resource in the case of multiplexing HP PUCCH to PUSCH or the like.

On the other hand, the UE 200 may perform feedback control using the resource on LP HARQ-ACK based on the settings on Low priority when Low priority is set by PhysicalCellGroupConFig. That is, a specific HARQ-ACK is an LP HARQ-ACK.

The setting for low priority may be set by an RRC message (For example, PUCCH-Config for LP HARQ- ACK). For example, the UE 200 may determine the timing of the HARQ-ACK. The timing of the HARQ-ACK may be determined on a slot-based or sub-slot-based basis. The UE 200 uses the LP PUCCH resource as a resource (LP HARQ-ACK PUCCH resource) used to transmit a codebook (LP HARQ-ACK CB) for LP HARQ-ACK. The LP PUCCH resource may be a resource in the case of multiplexing LP PUCCH to PUSCH or the like.

(4.4) Predetermined Definitions

The UE 200 may perform feedback control based on the predefined definitions in radio communication system 10. That is, if feedback on HP HARQ-ACK and LP HARQ-ACK is requested, it may be specified whether feedback control using resources on HP HARQ-ACK or LP HARQ-ACK (That is, a specific HARQ-ACK) should be performed.

(5) Operation Example 2

Operation example 2 related to the embodiment will be described below. In the following, the case where HP HARQ-ACK and LP HARQ ACK are mixed will be mainly described. In operation example 2, when feedback control of both HP HARQ-ACK and LP HARQ ACK is required, a case where HARQ-ACK is transmitted through separate PUCCHs is assumed.

In the following examples, there are cases where HARQ-ACK #0, HARQ-ACK #1, . . . HARQ-ACK #k and . . . HARQ-ACK #N exist as HARQ processes corresponding to Cell index #1. HARQ-ACK #0 and HARQ-ACK #k are examples of HARQ processes corresponding to HP PDSCH, and HARQ-ACK #1 and HARQ-ACK #N are examples of HARQ processes corresponding to LP PDSCH.

(5.1) Example 2-1

First, a case in which feedback control on HP HARQ-ACK is performed is described. Here, a case in which the PDSCH in which feedback control is to be performed is determined to be HP PDSCH based on the information elements (For example, PDSCH-to-HARQ feedback timing indicator) contained in the DCI is described.

Figure 6:
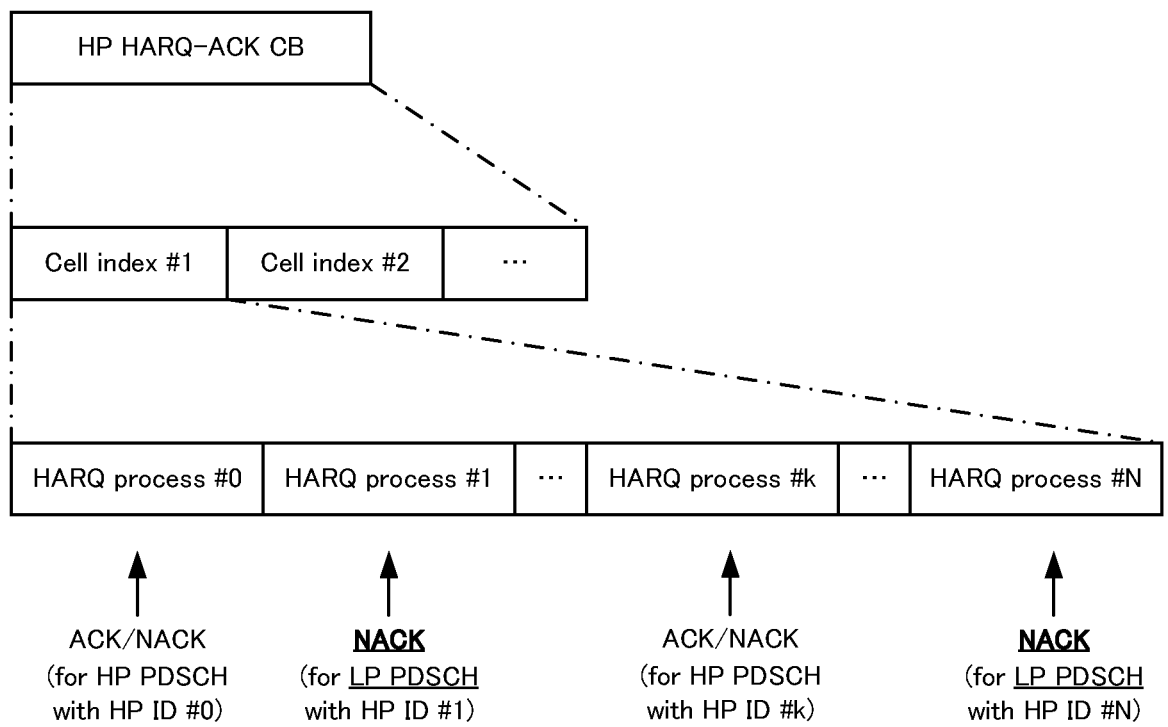
FIG. 6 is a diagram for explaining operation example 2-1.

In such a case, as shown in FIG. 6, HP HARQ-ACK CB is used as the codebook of HARQ-ACK. For the HARQ process (#0, #k, etc.) corresponding to HP PDSCH, ACK/NACK feedback control is executed as HP HARQ-ACK. On the other hand, for the HARQ process (#1, #N, etc.) corresponding to LP PDSCH, NACK feedback control is always executed as LP HARQ-ACK. That is, LP HARQ-ACK is forced to be set to NACK, so there is virtually no feedback control of LP HARQ-ACK. In other words, a specific HARQ-ACK may be considered to be an HP HARQ-ACK.

Second, we describe a case where feedback control on LP HARQ-ACK is performed. Here, we describe a case where the PDSCH for which feedback control should be performed is determined to be LP PDSCH based on information elements (For example, PDSCH-to-HARQ feedback timing indicator) included in the DCI.

Figure 7:
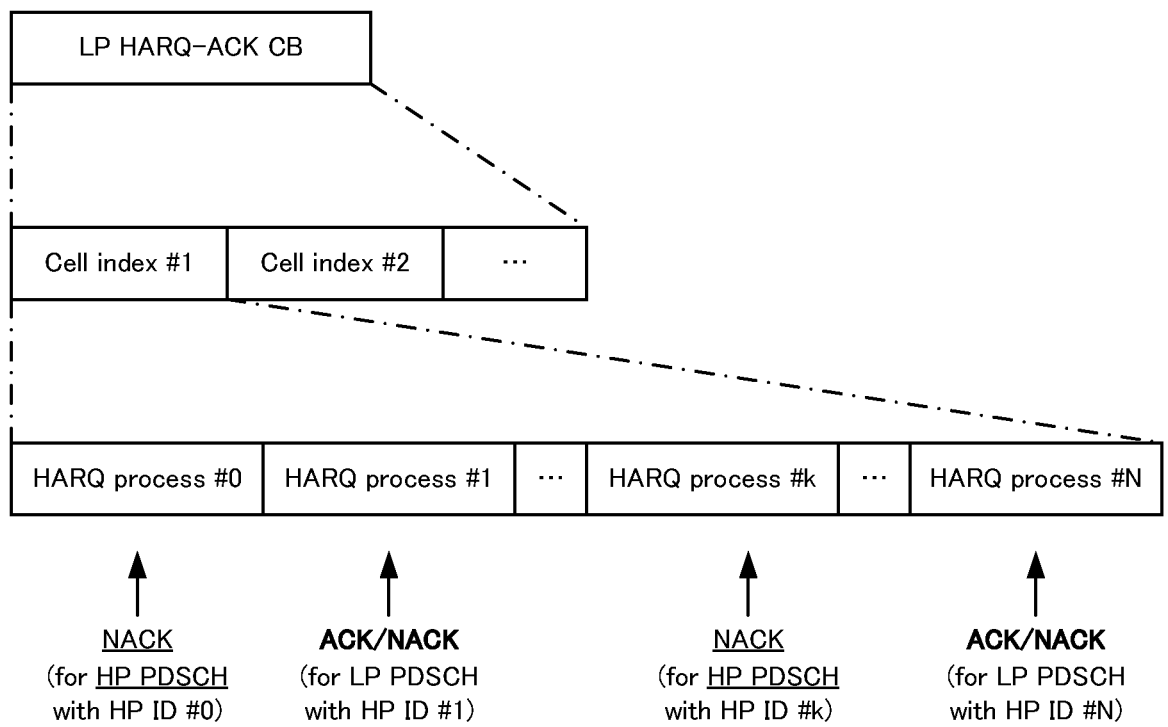
FIG. 7 is a diagram for explaining operation example 2-1.

In such a case, as shown in FIG. 7, LP HARQ-ACK CB is used as the codebook of HARQ-ACK. For the HARQ process (#1, #N, etc.) corresponding to LP PDSCH, ACK/NACK feedback control is executed as LP HARQ-ACK. On the other hand, for the HARQ process (#0, #k, etc.) corresponding to HP PDSCH, NACK feedback control is always executed as HP HARQ-ACK. That is, HP HARQ-ACK is forced to be set to NACK, so there is virtually no feedback control of HP HARQ-ACK. In other words, a specific HARQ-ACK may be considered to be an LP HARQ-ACK.

With such a configuration, there is no need to change the size of the HARQ-ACK CB used in the existing Type 3 HARQ-ACK feedback, although the HARQ-ACK (non-specific HARQ-ACK) where the NACK is forced is redundant. That is, the HARQ-ACK CB, which is already specified in Release 16 of 3GPP, etc., can be borrowed.

(5.2) Example 2-2

First, a case in which feedback control on HP HARQ-ACK is performed is described. Here, a case in which the PDSCH in which feedback control is to be performed is determined to be HP PDSCH based on the information elements (For example, PDSCH-to-HARQ feedback timing indicator) contained in the DCI is described. That is, feedback control of both HP HARQ-ACK and LP HARQ-ACK is required, but the specific HARQ-ACK is HP HARQ-ACK.

Figure 8:
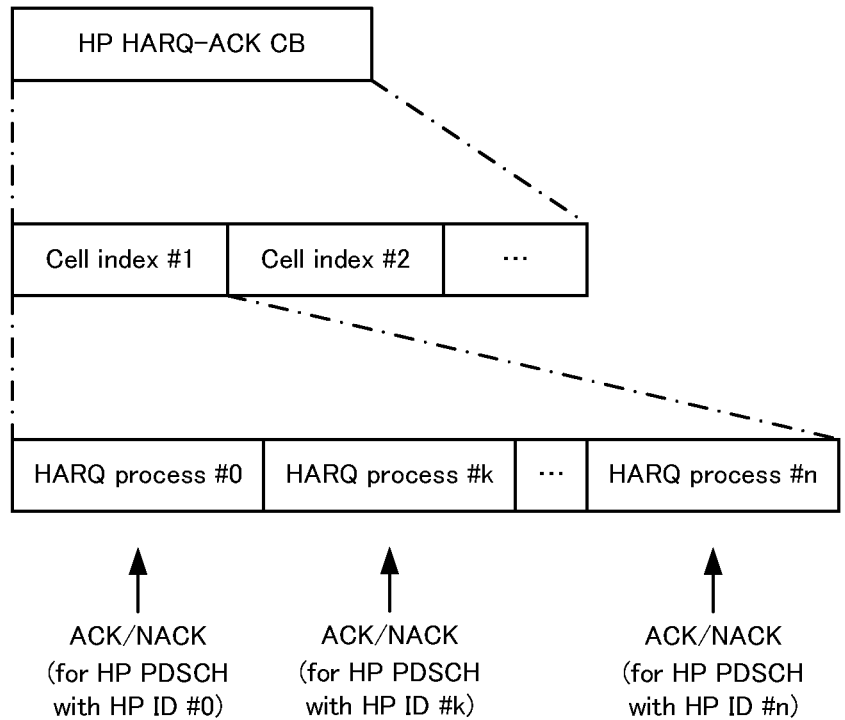
FIG. 8 is a diagram for explaining operation example 2-2.

In such a case, as shown in FIG. 8, for the HARQ process corresponding to HP PDSCH (#0, #k, #n, etc.), feedback control of HP HARQ-ACK is performed using HP HARQ-ACK CB. On the other hand, for the HARQ process corresponding to LP PDSCH (#1, #N, etc.), feedback control of LP HARQ-ACK is omitted (skipped). Therefore, the HP HARQ-ACK CB does not contain the bit (code) for LP HARQ-ACK.

Second, we describe a case where feedback control on LP HARQ-ACK is performed. Here, we describe a case where the PDSCH for which feedback control should be performed is determined to be LP PDSCH based on information elements (For example, PDSCH-to-HARQ feedback timing indicator) included in the DCI. That is, both HP HARQ-ACK and LP HARQ-ACK feedback control are required, but the specific HARQ-ACK is LP HARQ-ACK.

Figure 9:
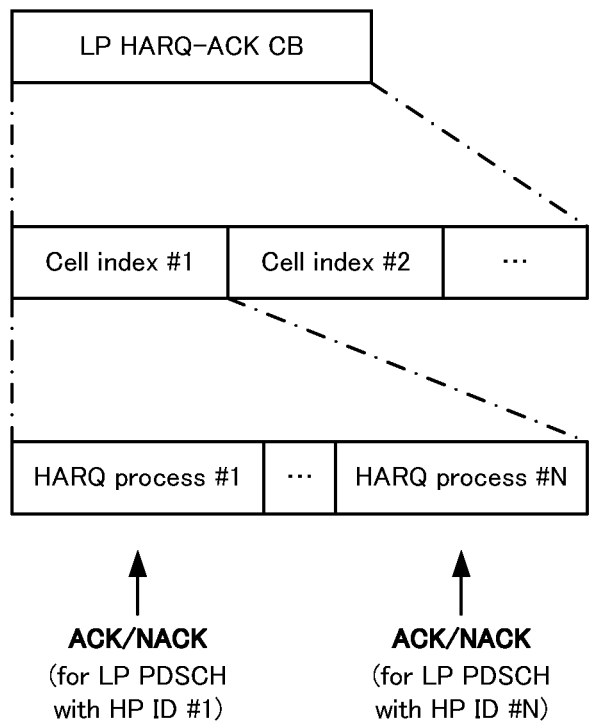
FIG. 9 is a diagram for illustrating operation example 2-2.

In such a case, as shown in FIG. 9, for the HARQ process corresponding to LP PDSCH (#1, #N, etc.), feedback control of LP HARQ-ACK is performed using LP HARQ-ACK CB. On the other hand, for the HARQ process corresponding to HP PDSCH (#0, #k, #n, etc.), feedback control of HP HARQ-ACK is omitted (skipped). Therefore, LP HARQ-ACK CB does not include the bit (code) for HP HARQ-ACK.

With such a configuration, since the sizes of HP HARQ-ACK CB and LP HARQ-ACK CB need to be dynamically changed, redundancy (transmission of a non-specific HARQ-ACK for which NACK is forcibly set) caused in operation example 2-1 can be suppressed, although the size perception of HP HARQ-ACK CB and LP HARQ-ACK CB may differ between gNB 100 and UE 200.

(6) Action and Effect

In an embodiment, the UE 200 performs feedback control with resources on a specific HARQ-ACK of either HP HARQ-ACK or LP HARQ-ACK if 2 or more HARQ-ACKs include HP HARQ-ACK and LP HARQ-ACK. With such a configuration, even in the case of transmitting HARQ-ACKs with different priorities in a Type 3 HARQ-ACK feedback configured to transmit 2 or more HARQ-ACKs in a single PUCCH, communication of HARQ-ACKs can be properly performed because the resources used in the Type 3 HARQ-ACK feedback are clear.

(7) Modification Example 1

Modification Example 1 of the embodiment will be described below. The differences from the embodiment will be mainly described below.

In the embodiment, a case in which feedback control of both HP HARQ-ACK and LP HARQ-ACK is required assuming Type 3 HARQ-ACK feedback is illustrated. In contrast, Modification Example 1 describes a case in which feedback control of either HP HARQ-ACK or LP HARQ-ACK is required, assuming Type 3 HARQ-ACK feedback.

Since Modification Example 1 requires feedback control of either HP HARQ-ACK or LP HARQ-ACK, the HARQ-ACK for which feedback control is required is the target HARQ. That is, the UE 200 performs feedback control by assuming that the HARQ-ACK for which feedback control is requested is the target HARQ. The gNB 100 assumes feedback control by assuming that the HARQ-ACK for which feedback control is requested is the target HARQ.

As for resources related to feedback control, operation example 1, operation example 2-1 or operation example 2-2 described in the embodiment can be applied. Therefore, the detailed explanation is omitted.

Although not particularly limited, in Modification Example 1, feedback control of the HP HARQ-ACK may be requested without requiring feedback control of the LP HARQ-ACK. With such a configuration, when multiple SPS PDSCH can be set and the SPS PDSCH period is shortened, and when two or more HARQ ACKs need to be transmitted in a batch, the resource overhead on the HARQ ACK can be reduced by limiting the request for feedback control of the HP HARQ-ACK.

(8) Other Embodiments

Although the contents of the present invention have been described above in accordance with the embodiment, it is obvious to those skilled in the art that the present invention is not limited to these descriptions and that various modifications and improvements are possible.

Although not specifically mentioned in the above described embodiment, which of the options such as Example 1, Example 2-1 and Example 2-2 should be applied may be set by the upper layer parameters or may be predetermined by radio communication system 10.

Although not specifically mentioned in the above described embodiment, capability information indicating whether the UE 200 supports the options such as Example 1, Example 2-1 and Example 2-2 may be defined. The UE 200 may send capability information to the NG RAN 20. The UE 200 may be for 2 or more options.

Although not specifically mentioned in the above described embodiment, which of the options such as operation example 1, operation example 2-1 and operation example 2-2 should be applied may be set based on the upper layer parameters and the capability information of the UE 200.

Although not specifically mentioned in the above described embodiment, the capability information indicating whether the UE 200 supports the Type 3 HARQ-ACK feedback for HARQ-ACKs with different priorities may be defined. In the Type 3 HARQ-ACK feedback, the capability information indicating whether the UE 200 supports the function of sending HARQ-ACKs with different priorities in one PUCCH may be defined. In the Type 3 HARQ-ACK feedback, the capability information indicating whether the UE 200 supports the function of sending HARQ-ACKs with different priorities in different PUCCHs may be defined. In the Type 3 HARQ-ACK feedback, the capability information indicating whether the UE 200 supports the function of sending HARQ-ACKs with one priority in PUCCH may be defined. The UE 200 may send capability information to NG RAN 20.

In the above described embodiment, Type 3 HARQ-ACK feedback was mainly described. However, the embodiment is not limited to this. For example, the operation example 1 described above may be applied to e-Type 2 HARQ-ACK feedback in a case where HARQ-ACKs with different priorities are transmitted via one PUCCH.

The block diagram used for the description of the above embodiment (FIG. 4 and FIG. 5) shows a block of functional units. Those functional blocks (structural components) can be realized by a desired combination of at least one of hardware and software. Means for realizing each functional block is not particularly limited. That is, each functional block may be realized using one physically or logically coupled device, or two or more physically or logically separated devices may be directly or indirectly connected (For example, using wired, wireless, etc.) and realized using these multiple devices. The functional block may be realized by combining the software with the one device or the multiple devices.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that makes transmission work is called a transmission unit (transmitting unit) or transmitter. In either case, as described above, the implementation method is not particularly limited.

Figure 10:
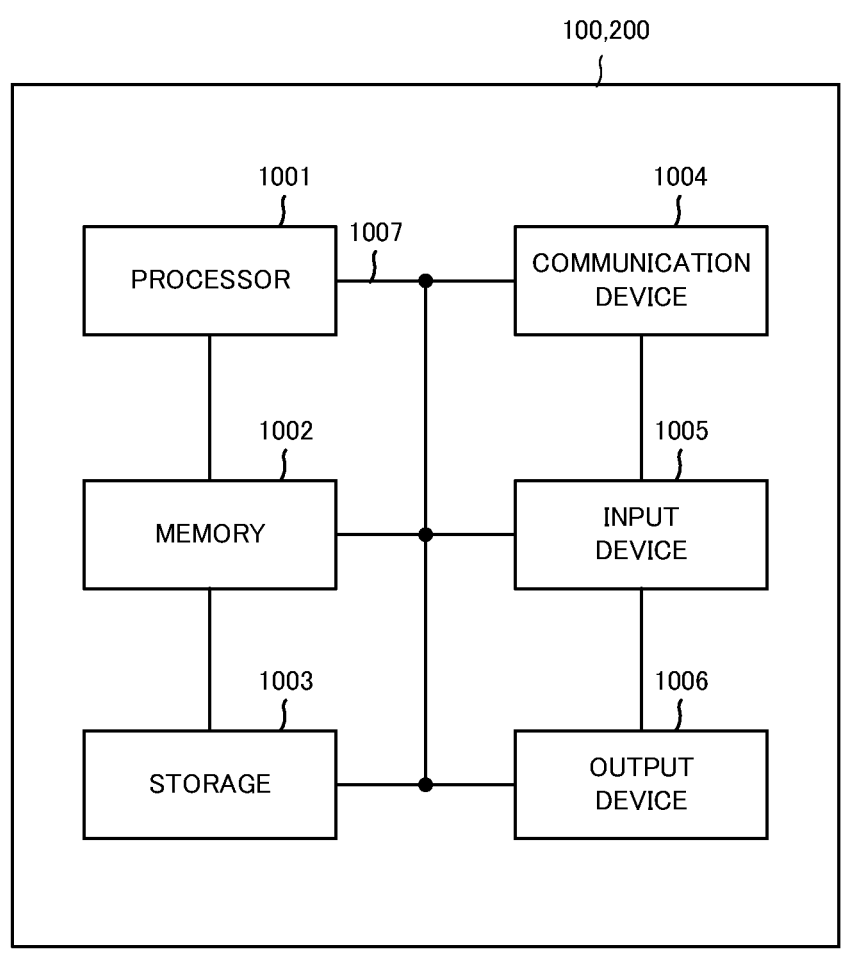
FIG. 10 shows an example of the hardware configuration of the gNB 100 and the UE 200.

Furthermore, the above-mentioned gNB 100 and UE 200 (the device) may function as a computer for processing the radio communication method of the present disclosure. FIG. 10 shows an example of the hardware configuration of the device. As shown in FIG. 10, the device may be configured as a computer device including a processor 1001, a memory 1002, a storage 1003, a communication device 1004, an input device 1005, an output device 1006, a bus 1007, etc.

Furthermore, in the following explanation, the term "device" can be replaced with a circuit, device, unit, and the like. The hardware configuration of the device may be configured to include one or more of each device shown in the figure, or it may be configured without some devices.

Each functional block of the device (see FIG. 4) is realized by any hardware element of the computer device or a combination of the hardware elements.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

The processor 1001 controls the entire computer by, for example, operating the operating system. The processor 1001 may consist of a central processing unit (CPU) including interfaces with peripheral devices, controllers, arithmetic units, registers, etc.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Furthermore, the various processes described above may be performed by one processor 1001 or simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. Memory 1002 may be referred to as a register, cache, main memory, etc. Memory 1002 may store programs (program code), software modules, etc., that are capable of executing a method according to one embodiment of this disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Each device such as a processor 1001 and a memory 1002 is connected by a bus 1007 for communicating information. Bus 1007 may be configured using a single bus or different buses between devices.

Furthermore, the device may be configured including hardware such as a microprocessor, a digital signal processor (DSP), an application specific integrated circuit (ASIC), a programmable logic device (PLD), a field programmable gate array (FPGA), etc., with which some or all of the functional blocks may be implemented. For example, the processor 1001 may be implemented by using at least one of these hardware.

Also, the notification of information is not limited to the mode/embodiment described in this disclosure and may be made using other methods. For example, the notification of information may be carried out by physical layer signaling (e.g., Downlink Control Information (DCI), Uplink Control Information (UCI)), higher layer signaling (e.g., RRC signaling, Medium Access Control (MAC) signaling, notification information (Master Information Block (MIB), System Information Block (SIB)), other signals or a combination thereof. The RRC signaling may also be referred to as an RRC message, e.g., an RRC Connection Setup message, an RRC Connection Reconfiguration message, etc.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, etc., of each mode/embodiment described in this disclosure may be reordered as long as there is no conflict. For example, the method described in this disclosure uses an illustrative order to present elements of various steps and is not limited to the specific order presented.

The specific operation that is performed by the base station in the present disclosure may be performed by its upper node in some cases. In a network consisting of one or more network nodes with base stations, it is clear that various operations performed for communication with terminals can be performed by the base station and at least one of the other network nodes (For example, but not limited to MME or S-GW) other than the base station. In the above, an example in which there is one network node other than the base station is explained; however, a combination of a plurality of other network nodes (for example, MME and S-GW) may be used.

Information, signals (information, etc.) can be output from an upper layer (or lower layer) to a lower layer (or upper layer). It may be input and output via a plurality of network nodes.

The input/output information can be stored in a specific location (for example, a memory) or can be managed in a management table. Information that is input or output may be overwritten, updated, or appended. The information can be deleted after outputting. The inputted information can be transmitted to another device.

Decisions may be made by a value represented by a single bit (0 or 1), by a truth value (Boolean: true or false), or by comparing numbers (For example, a comparison with a given value).

Each aspect/embodiment described in this disclosure may be used alone, in combination, or switched as execution proceeds. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, if the software is transmitted from a website, server, or other remote source using at least one of wired technology (Coaxial cable, fiber optic cable, twisted pair, Digital subscriber Line (DSL), etc.) and wireless technology (Infrared, microwave, etc.), at least one of these wired and wireless technologies is included within the definition of a transmission medium.

Information, signals, or the like mentioned above may be represented by using any of a variety of different technologies. For example, data, instructions, commands, information, signals, bits, symbols, chips, etc. that may be referred to throughout the above description may be represented by voltage, current, electromagnetic wave, magnetic field or magnetic particle, light field or photon, or any combination thereof.

It should be noted that the terms described in this disclosure and terms necessary for the understanding of this disclosure may be replaced with terms having the same or similar meanings. For example, at least one of the channels and symbols may be a signal (signaling). Also, the signal may be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)," "radio base station," "fixed station," "NodeB," "eNodeB (eNB)," "gNodeB (gNB)," "access point," "transmission point," "reception point," "transmission/reception point," "cell," "sector," "cell group," "carrier," "component carrier," and the like can be used interchangeably. The base station may also be referred to with the terms such as a macro cell, a small cell, a femtocell, or a pico cell.

A base station can house one or more (For example, three) cells, also called sectors. In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a base station performing communication services in this coverage and to part or all of the coverage area of at least one of the base station subsystems.

In the present disclosure, the terms "mobile station (Mobile Station: MS)," "user terminal," "user equipment (User Equipment: UE)," "terminal" and the like can be used interchangeably.

A mobile station may be referred to by those skilled in the art as a subscriber station, mobile unit, subscriber unit, wireless unit, remote unit, mobile device, radio communication device, remote device, mobile subscriber station, access terminal, mobile terminal, wireless terminal, remote terminal, handset, user agent, mobile client, client, or some other appropriate term.

At least one of a base station and a mobile station may be called a transmitting device, a receiving device, a communication device, or the like. Note that, at least one of a base station and a mobile station may be a device mounted on a moving body, a moving body itself, or the like. The mobile may be a vehicle (For example, cars, airplanes, etc.), an unattended mobile (For example, drones, self-driving cars, etc.), or a robot (manned or unmanned). At least one of a base station and a mobile station can be a device that does not necessarily move during the communication operation. For example, at least one of a base station and a mobile station may be an Internet of Things (IoT) device such as a sensor.

The base station in this disclosure may also be read as a mobile station (user terminal, hereinafter the same). For example, each mode/embodiment of this disclosure may be applied to a configuration in which communication between a base station and a mobile station is replaced with communication between multiple mobile stations (For example, it may be called Device-to-Device (D2D), Vehicle-to-Everything (V2X), etc.). In this case, the mobile station may have the function of the base station. In addition, words such as "up" and "down" may be replaced with words corresponding to communication between terminals (For example, "side"). For example, terms an uplink channel, a downlink channel, or the like may be read as a side channel.

Similarly, mobile stations in this disclosure may be replaced with base stations. In this case, the base station may have the function of the mobile station.

A radio frame may consist of one or more frames in the time domain. Each one or more frames in the time domain may be referred to as a subframe.

A subframe may further consist of one or more slots in the time domain. A subframe may have a fixed length of time (For example, 1 ms) independent of numerology.

Numerology may be a communication parameter applied to at least one of the transmission and reception of a signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

Slots may consist of one or more symbols (Orthologous Frequency Division Multiplexing (OFDM)) symbols, Single Carrier Frequency Division Multiple Access (SC-FDMA) symbols, etc., in the time domain. A slot may be a unit of time based on the numerology.

A slot may include a plurality of minislots. Each minislot may consist of one or more symbols in the time domain. A minislot may also be called a subslot. A minislot may be composed of fewer symbols than slots. A PDSCH (or PUSCH) transmitted in units of time larger than the minislot may be referred to as a PDSCH (or PUSCH) mapping type A. A PDSCH (or PUSCH) transmitted using the minislot may be referred to as a PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called the transmission time interval (TTI), multiple consecutive subframes may be called TTI, or one slot or one minislot may be called TTI. That is, at least one of the subframes and TTI may be a subframe (1 ms) in existing LTE, a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

If one slot or one minislot is called a TTI, one or more TTIs (That is, one or more slots or one or more minislots) may be the minimum unit of time for scheduling. In addition, the number of slots (number of minislots) constituting the minimum unit of time for scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTIs that are usually shorter than TTI may be called shortened TTI, short TTI, partial or fractional TTI, shortened subframe, short subframe, minislot, subslot, slot, etc.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

A resource block (RB) is a resource allocation unit in the time and frequency domains, and may include one or more consecutive subcarriers in the frequency domain. The number of subcarriers included in RB may be, for example, twelve, and the same regardless of the topology. The number of subcarriers included in the RB may be determined based on the neurology.

The time domain of the RB may also include one or more symbols, and may be one slot, one minislot, one subframe, or one TTI long. One TTI, one subframe, and the like may each consist of one or more resource blocks.

One or more RBs may be referred to as Physical RB (PRB), Sub-Carrier Group (SCG), Resource Element Group (REG), PRB pair, RB pair, and the like.

A resource block may also be composed of one or more Resource Elements (RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be identified by an index of RBs relative to the common reference point of the carrier. PRB may be defined in BWP and numbered within that BWP.

BWP may include UL BWP (UL BWP) and DL BWP (DL BWP). For a UE, one or more BWPs may be set within a carrier.

At least one of the configured BWPs may be active, and the UE may not expect to send and receive certain signals/channels outside the active BWP. Note that "cell," "carrier," and the like in this disclosure may be read as "BWP."

The above-described structures such as a radio frame, subframe, slot, minislot, and symbol are merely examples. For example, configurations such as the number of subframes contained in a radio frame, the number of subframes or slots per radio frame, the number of minislots contained in a slot, the number of symbols and RBs contained in a slot or minislot, the number of subcarriers contained in an RB, and the number of symbols, symbol length, and Cyclic Prefix (CP) length in a TTI can be varied variably.

The terms "connected," "coupled" or any variation thereof mean any connection or combination, directly or indirectly, between two or more elements and may include the presence of one or more intermediate elements between two elements that are "connected" or "coupled" to each other. The connection or connection between elements may be physical, logical or a combination thereof. For example, "connection" may be read as "access." As used in this disclosure, two elements may be considered to be "connected" or "coupled" to each other using at least one of one or more wire, cable and printed electrical connections and, as a few non-limiting and non-comprehensive examples, electromagnetic energy with wavelengths in the radio frequency domain, the microwave domain and the optical (both visible and invisible) domain.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on."

The "means" in the configuration of each apparatus may be replaced with "unit," "circuit," "device," and the like.

Any reference to elements using designations such as "first" or "second" as used in this disclosure does not generally limit the amount or order of those elements. Such designations can be used in the present disclosure as a convenient way to distinguish between two or more elements. Thus, references to the first and second elements do not imply that only two elements can be adopted there or that the first element must in some way precede the second element.

In the present disclosure, the used terms "include," "including," and variants thereof are intended to be inclusive in a manner similar to the term "comprising." Furthermore, the term "or (or)" as used in this disclosure is not intended to be an exclusive OR.

Throughout this disclosure, for example, during translation, if articles such as a, an, and the in English are added, in this disclosure, these articles shall include plurality of nouns following these articles.

As used in this disclosure, the terms "determining," "judging" and "deciding" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. That is, "judgment" and "determination" may include regarding some action as "judgment" and "determination." Moreover, "judgment (decision)" may be read as "assuming," "expecting," "considering," and the like.

In the present disclosure, the term "A and B are different" may mean "A and B are different from each other." It should be noted that the term may mean "A and B are each different from C." Terms such as "leave," "coupled," or the like may also be interpreted in the same manner as "different."

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
110 Reception unit
120 Transmission unit
130 Control unit
200 UE
210 Radio signal transmission and reception unit
220 Amplifier unit
230 Modulation and demodulation unit
240 Control signal and reference signal processing unit
250 Encoding/decoding unit
260 Data transmission and reception unit
270 Control unit
1001 Processor
1002 Memory
1003 Storage
1004 Communication device
1005 Input device
1006 Output device
1007 Bus

The invention claimed is:

1. A terminal comprising:
a receiver that receives downlink control information, which has priority indication and triggers feedback control of two or more acknowledgments;
a processor that performs feedback control of the two or more acknowledgments over one physical uplink control channel, wherein
the processor specifies a resource of the one physical uplink control channel based on information contained in the downlink control information.

2. The terminal according to claim 1, wherein
the processor performs the feedback control based on a configuration regarding radio resource control.

3. The terminal according to claim 1, wherein
the processor performs the feedback control on a sub-slot-based basis, based on a configuration regarding a radio resource control layer.

4. A communication system comprising a terminal and a base station, wherein
the terminal comprises:
a receiver that receives downlink control information, which has priority indication and triggers feedback control of two or more acknowledgments; and
a processor that performs feedback control of the two or more acknowledgments over one physical uplink control channel, and
the processor specifies a resource of the one physical uplink control channel based on information contained in the downlink control information.

5. A communication method of a terminal, comprising:
a reception step of receiving downlink control information, which has priority indication and triggers feedback control of two or more acknowledgments; and
a control step of performing feedback control of the two or more acknowledgments over one physical uplink control channel,
wherein the control step specifies a resource of the one physical uplink control channel based on information contained in the downlink control information.

* * * * *